AUTOMATIC COUPLING AND IMPEDANCE MATCHING NETWORK

Filed Dec. 22, 1961 7 Sheets-Sheet 1

INVENTORS
BERNARD J. BEITMAN JR.
LONEY R. DUNCAN JR.
MERRILL T. LUDVIGSON
DONALD R. STEVENS
BY Moody and Harris
ATTORNEYS Dec. 8, 1964 B. J. BEITMAN, JR., ETAL 3,160,832

AUTOMATIC COUPLING AND IMPEDANCE MATCHING NETWORK

Filed Dec. 22, 1961 7 Sheets-Sheet 2

INVENTORS
BERNARD J. BEITMAN JR.
LONEY R. DUNCAN JR
MERRILL T. LUDVIGSON
DONALD R. STEVENS
BY Moody and Harris
ATTORNEYS INVENTORS
BERNARD J. BEITMAN JR.
LONEY R. DUNCAN JR.
MERRILL T. LUDVIGSON
DONALD R. STEVENS
BY Moody and Harris
ATTORNEYS

AUTOMATIC COUPLING AND IMPEDANCE MATCHING NETWORK

Filed Dec. 22, 1961 7 Sheets-Sheet 4

INVENTORS
BERNARD J. BEITMAN JR.
LONEY R. DUNCAN JR.
MERRILL T. LUDVIGSON
DONALD R. STEVENS
BY Moody and Harris
ATTORNEYS

AUTOMATIC COUPLING AND IMPEDANCE MATCHING NETWORK

Filed Dec. 22, 1961 7 Sheets-Sheet 5

INVENTORS
BERNARD J. BEITMAN JR.
LONEY R. DUNCAN JR.
MERRILL T. LUDVIGSON
DONALD R. STEVENS
Moody and Harris
ATTORNEYS

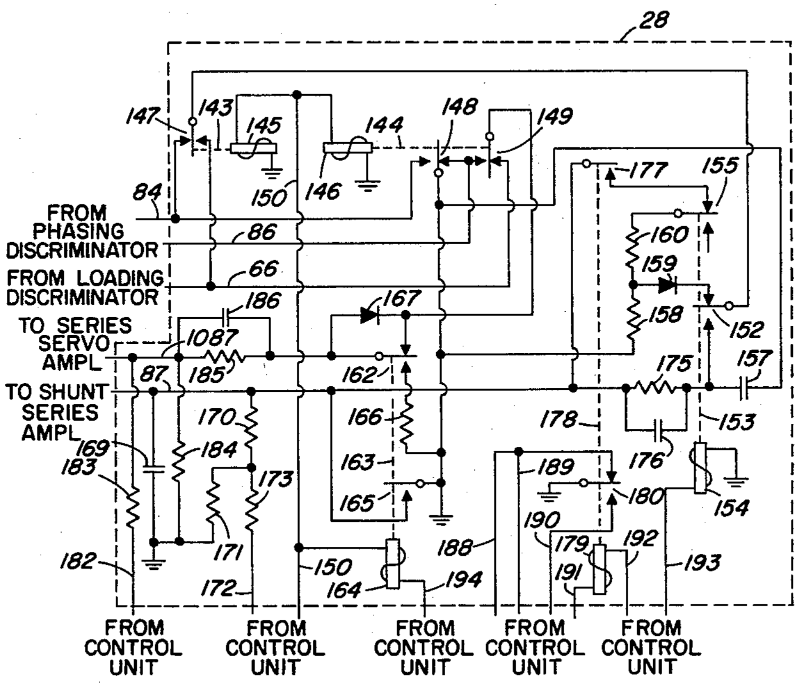
FIG 8
| | |
|---|---|
| FIG 3 | FIG 4 |
| FIG 5 | FIG 6 |
FIG 7
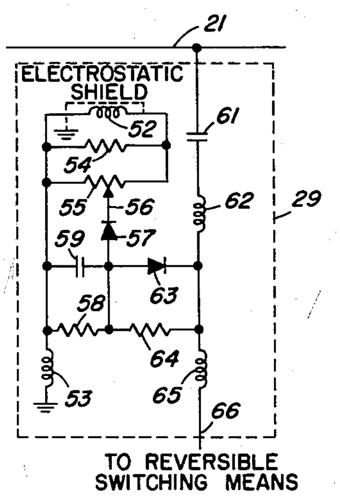
FIG 9
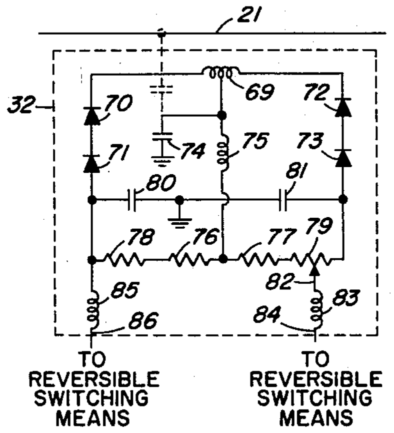
FIG 10
INVENTORS
BERNARD J. BEITMAN JR.
LONEY R. DUNCAN JR.
MERRILL T. LUDVIGSON
DONALD R. STEVENS
BY Moody and Harris
ATTORNEYS INVENTORS
BERNARD J. BEITMAN JR.
LONEY R. DUNCAN JR.
MERRILL T. LUDVIGSON
DONALD R. STEVENS
BY Moody and Harris
ATTORNEYS

United States Patent Office 3,160,832

Patented Dec. 8, 1964

3,160,832

AUTOMATIC COUPLING AND IMPEDANCE MATCHING NETWORK

Bernard J. Beitman, Jr., Marion, Loney R. Duncan, Jr., Hiawatha, and Merrill T. Ludvigson and Donald R. Stevens, Cedar Rapids, Iowa, assignors to Collins Radio Company, Cedar Rapids, Iowa, a corporation of Iowa Filed Dec. 22, 1961, Ser. No. 161,598

7 Claims. (Cl. 333—17)

This invention relates to an improved network for matching the impedance of an output line to that of an input line and, more particularly, to a network capable of sensing a mismatch and correcting the same in a minimum amount of time to thereafter provide maximum efficiency in transfer of energy from said input line to said output line.

The impedance of an output line is commonly matched to that of an input line by careful value selection of capacitive and inductive reactance elements and proper connections of the elements, both in shunt and series, in the coupling circuit. While this might be fairly simple where the output line impedance is to be matched to that of the input line for a single frequency, it becomes a difficult task when the impedances are to be matched over a wide range of frequencies.

While many circuits have been suggested and utilized heretofore for controlling the impedance match between an output line and an input line, all have failed either in achieving a satisfactory match, or have required a relatively long period of time to achieve the satisfactory match.

While it is, of course, critical for maximum transfer of energy that a satisfactory match be achieved, it is also important that the satisfactory match be achieved in as short a period of time as possible. This is due to the fact that all of the time required for tuning, or achieving the match, represents loss of performance in the overall equipment, compromises transmitter performance and reliability by presenting an undesirable load during tuning, and reduces the usable life of the network.

The network of this invention requires very little tuning time even though the frequency range covered is appreciable, and constitutes an improvement over tuning circuits heretofore utilized, which circuits commonly required sequential tuning of the reactance elements in the coupling circuit. Such a circuit is shown, for example, in United States Patent Number 2,921,273, issued to Samuel L. Broadhead, Jr., and Merrill T. Ludvigson, and assigned to the assignee of the present invention.

It is, therefore, an object of this invention to provide an improved network capable of matching the impedance of an output line to that of an input line at a selected frequency within a wide range of frequencies in a very short period of time and thereafter provide a highly satisfactory match at that selected frequency.

It is another object of this invention to provide an improved network for matching the impedance of an output line to that of an input line having a control circuit capable of sensing error and repositioning the inductive and capacitive reactance elements of the coupling circuit only when necessary to eliminate the error.

More particularly, it is another object of this invention to provide a matching network having a control unit with means to sense whether capacitive reactance should be added to the coupling circuit and if so whether in series or shunt, to cause the proper capacitance to be added if needed, to sense a lack of resonance, to cause the series inductive reactance to fully resonate the output line, to sense the loading of the output line with respect to a desired value, and to cause the inductive reactance to resonate the output line at said desired value of loading impedance.

It is still another object of this invention to provide an improved coupling and matching network wherein the stray capacitance of the input line is resonated prior to matching the output line to the input line to thereby facilitate matching.

It is still another object of this invention to provide a method for tuning a coupling and matching network in a minimum amount of time.

The improved coupling and impedance matching network of this invention includes a coupling network, having series and shunt connected capacitors and inductors, and a control circuit having means whereby the reactance of the output line at a particular frequency is sensed and, if inductive, series capacitance is added to the coupling circuit immediately while the series coil is being driven to resonate the output line. If the antenna is still inductive, the series capacitance is immediately removed and shunt capacitance later added to make the output line appear capacitive. After resonating the output line, the impedance is then sensed with respect to a predetermined value, and if greater, the shunt capacitor and the series inductor are adjusted until the impedance is less than the predetermined value, after which the phasing of the input line voltage with respect to current is sensed, as well as the output line impedance with respect to the predetermined value, and the series and shunt inductors driven until zero error occurs, at which time the output line is matched to the input line at the predetermined impedance value at said particular frequency. The control circuitry by which this is accomplished is a feature of this invention.

With these and other objects in view which will become apparent to one skilled in the art as the description proceeds this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one complete example of the embodiment of the invention constructed according to the best mode so far devised for the practical application of the principles thereof, and in which.

Figure 11:
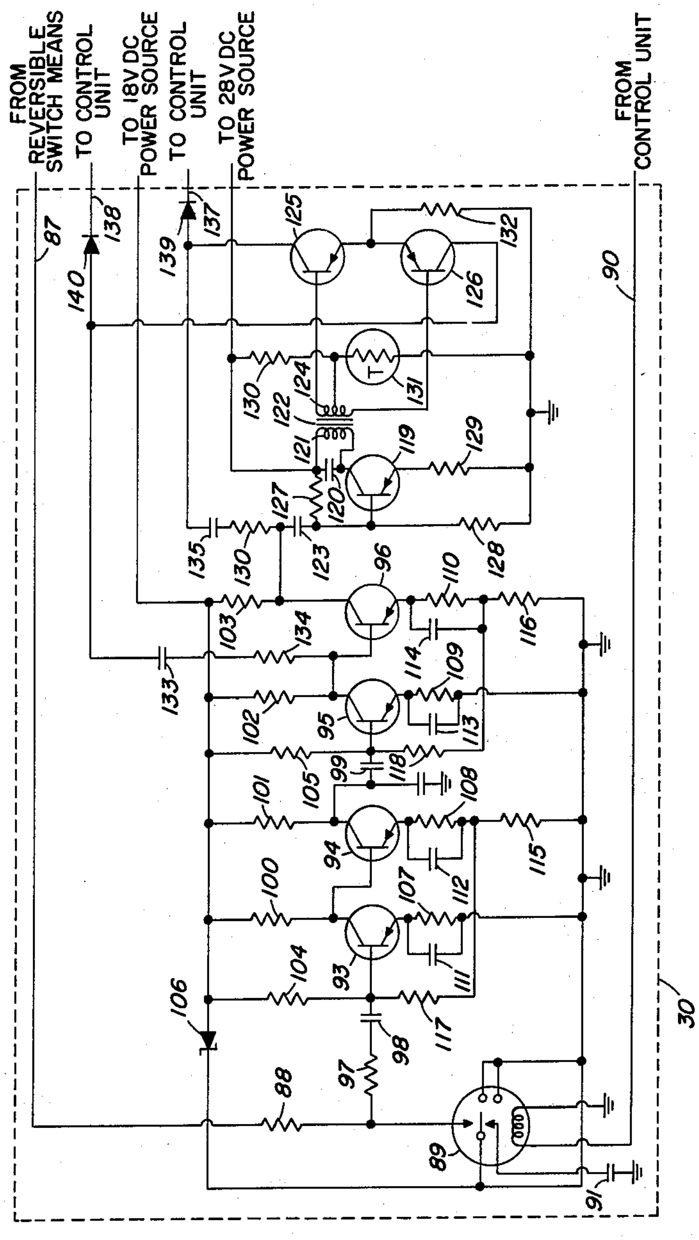

FIGURES 3, 4, 5, and 6 each illustrate, in schematic form, a portion of the matching element control unit of this invention;

FIGURE 7 shows the proper orientation of FIGURES 3, 4, 5 and 6 to illustrate the entire matching element control unit of this invention;

FIGURE 8 illustrates schematically the reversible switching means utilized in this invention;

FIGURE 9 is a schematic diagram of the loading discriminator utilized in this invention;

FIGURE 10 is a schematic diagram of the phasing discriminator utilized in this invention; and FIGURE 11 is a schematic diagram of one of the servo amplifiers utilized in this invention.

Figure 1:
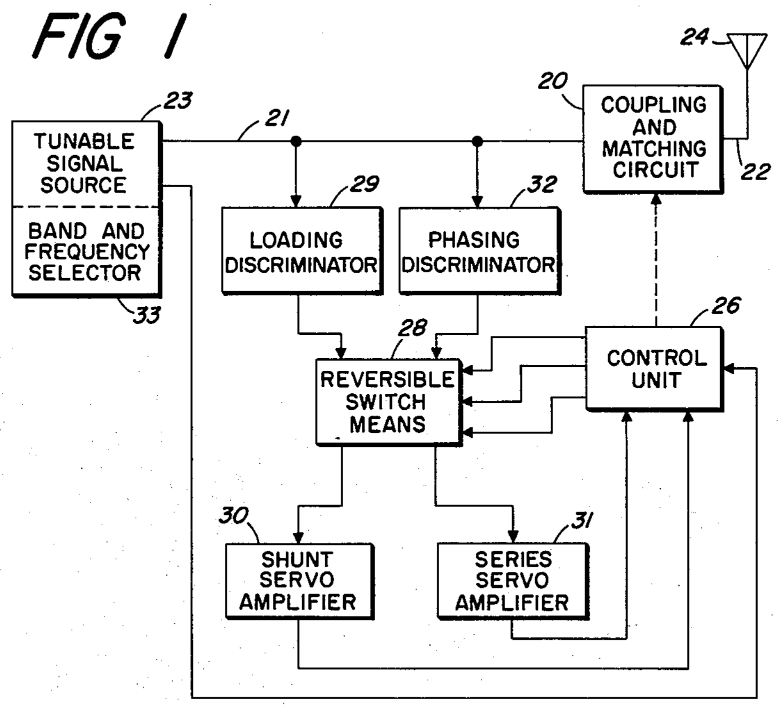
FIGURE 1 is a block diagram depicting generally the network of this invention.

Referring now to the drawings, in which like numerals have been used for like characters throughout, the numeral 20 designates generally the coupling and matching circuit of this invention, which circuit connects input line 21 with output line 22. As shown best in FIGURE 1, the input line may be connected to a tunable signal source 23, such as a conventional transmitter, while the output line may be connected to a conventional antenna 24 so that the impedance matching is actually that of antenna 24 to the input transmission line.

Control unit 26 controls the positioning of the switches in coupling circuit 20 to thereby control the fixed elements therein, and in addition, controls the application of the output error signals through the two servo loops to thereby control the positioning of the variable elements of coupling circuit 20.

The two servo loops are determined by reversible switch means 28, which switch means connects the output of loading discriminator 29 to either the shunt servo amplifier 30 or the series servo amplifier 31, as needed. As is brought out more fully hereinafter, the shunt servo amplifier drives the shunt inductor in coupling circuit 20 and the series servo amplifier drives the series inductor in the coupling circuit. In like manner, phasing discriminator 32 is also connected to the servo amplifiers, but the discriminators are never connected to the same servo amplifier.

Tunable signal source 23 includes, as is conventional, a band and frequency selector 33, which selector is connected to control unit 26 to supply information to the coupling and matching network of a change in frequency and therefore a need to match the impedance of the output line to that of the input line for the new frequency selected.

Figure 2:
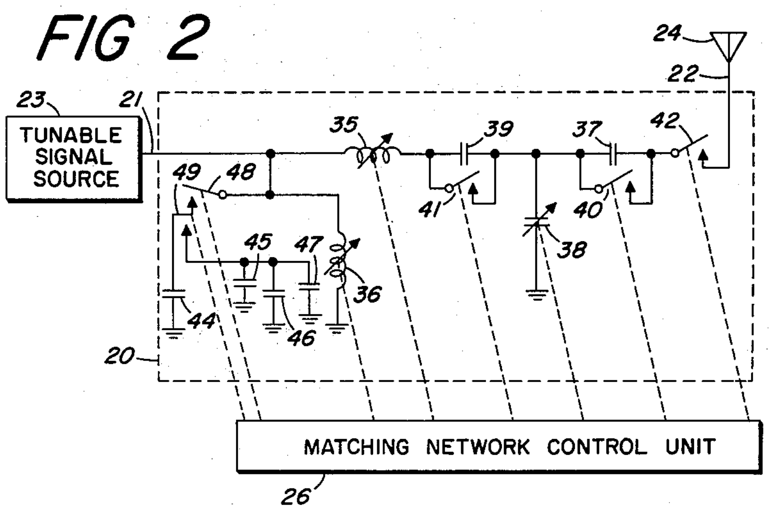
FIGURE 2 is a partial schematic diagram showing the coupling circuit of this invention.

As shown best in FIGURE 2, coupling circuit 20 includes a series coil 35, a shunt coil 36, a series fixed value capacitor 37, and a shunt capacitor 38. As is conventional, these four elements primarily control the impedance matching of the output line to the input line. As shown in FIGURE 2, however, when a frequency in band D is utilized, it is necessary to insert an additional series capacitor 39 in the matching network.

Capacitors 37 and 39 are inserted into coupling circuit 20 by means of switches 40 and 41, respectively. In addition, since the stray capacitance of the input line is resonated prior to matching, switch 42 is provided to disconnect the output line from the input line until the stray capacitance has been resonated.

As also shown in FIGURE 2, additional capacitance, connected in shunt, may be necessary in some cases to resonate the stray capacitance. This is provided by means of capacitors 44, 45, 46 and 47 which may be connected into the circuit by means of switches 48 and 49.

Loading discriminator 29 may be conventional and, as shown in FIGURE 9, may be transformer coupled from input transmission line 21 (which serves as the primary) by means of inductor 52 (which serves as the transformer secondary). Inductor 52 is grounded at one side through choke 53 and has loading resistors 54 and 55 connected in parallel therewith, the latter having a variable tap 56 for adjusting the magnitude of the signal coupled from the input line by transformer action. Resistors 54 and 55 are chosen so that the voltage developed across coil 52 is in phase with the transmission line current.

Variable tap 56 of resistor 55 is connected to rectifier 57, which in turn is connected to one side of resistor 58. The other side of resistor 58 is connected to ground through coil 53. In addition, a bypass capacitor 59 may be connected in parallel with resistor 58. Thus, the voltage developed across coil 52 is rectified by diode 57 so that a D.C. voltage is developed across resistor 58 that is proportional to the current of an input line 21.

A second signal is taken from input transmission line 21 through serially connected capacitor 61 and coil 62 to diode 63 where the input signal is rectified to produce a direct voltage across resistor 64 (connected in parallel with rectifier 63). The direct voltage developed across resistor 64 is proportional to the transmission line voltage and is opposite in polarity to the direct voltage developed across resistor 58. Thus, by proper adjustment of tap 56, the output taken across coil 65 and output lead 66 will be zero only when the voltage and current of input line 21 indicate that the impedances are matched at a preselected impedance value, which value may, for example, be 50 ohms if the impedance of the tunable source is 50 ohms.

If the impedance of the output line (or antenna if a part of the output line) is less than the preselected value, then this will affect the input line current-voltage relationship such that the voltage developed across resistor 58 will increase to cause an error signal of negative polarity to be produced. Likewise, if the impedance of the output line is greater than the preselected value, the net effect will cause an error signal of positive polarity to be produced. The error signal, if any, is coupled to reversible switching means 28 by means of lead 66.

Phasing discriminator 32 is also connected to input line 21 through transformer action with the input line serving as the primary and coil 69 serving as the secondary. One side of winding 69 is connected to a pair of diodes 70 and 71 connected in series, while the other side of winding 69 is likewise connected to a pair of diodes 72 and 73 also connected in series. Winding 69 is center tapped, and the center tap is connected through capacitor 74 to ground (which capacitor in conjunction with the line capacity, shown by dotted lines in FIGURE 10, serves as a voltage divider) and through coil 75 to the junction of resistors 76 and 77.

Resistor 76 is connected in series with resistor 78, while resistor 77 is connected in series with resistor 79. The other end of resistor 78 is connected to diode 71, while the other end of resistor 79 is connected to diode 73. In addition, the junction of diode 71 and resistor 78 is connected with ground through capacitor 80, while the junction of diode 73 and resistor 79 is connected with ground through capacitor 81.

Thus, capacitors 80 and 81 serve as an R.F. ground, while resistors 76 through 79 serve as loads for the four diodes in such a manner that the voltages developed across resistors 76 and 78 oppose the voltages developed across resistors 77 and 79. Since these developed direct voltages are proportional to the R.F. voltages appearing across the diodes, the output voltage with respect to ground is zero only when the voltage of the input line is in phase with the current.

When the input line voltage is not in phase with the current, there is an output error signal produced that is proportional to the phase difference. If, for example, current leads voltage slightly, as will be the case if the output line (or antenna) appears capacitive, an error signal is developed due to the line capacity (which remains in phase with the line voltage) and secondary 69 (which remains 90° out of phase with the line current).

An error signal, if produced in the phasing discriminator, is coupled to one of the servo amplifiers through reversing switch means 28, one output being taken through adjustable tap 82 of resistor 79, coil 83 and lead 84, while the other output is taken from the junction of diode 71 and resistor 78 through coil 85 and lead 86.

Servo amplifiers 30 and 31 may be identical and both may be conventional. FIGURE 11 illustrates shunt servo amplifier 30. Since series servo amplifier 31 may be identical, it has not been illustrated. For clarity of description, however, whenever a series servo amplifier element is referred to hereinafter, it will be referred to with the same numeral assigned to the elements of the shunt amplifier plus one thousand.

Servo amplifier 30 receives an input signal on lead 87 (designated 1087 for the input lead of servo amplifier 31), which input signal may be from one discriminator coupled through reversible switching means 28 or from the control unit 26. Input lead 87 is connected through resistor 88 to a conventional chopper 89 where the direct voltage is converted into a 60 cycle per second square wave signal in conventional manner. Chopper 89 is energized by a 6.3 volt, 60 c.p.s. source (not shown) coupled to the coil from control unit 26 through lead 90. As is conventional, the movable contactor of the chopper is connected to ground, while the other stationary contact engageable by the movable contactor is connected to ground through capacitor 91.

The 60 cycle per second square wave is amplified by two direct coupled pairs of amplifiers 93–94 and 95–96, the square wave signal being coupled to the base of transistor 93 through serially connected resistor 97 and capacitor 98. The signal is coupled between the two pairs of transistors through a capacitor 99 connected between the collector of transistor 94 and the base of transistor 95.

Operating voltages for transistors 93, 94, 95 and 96 are provided by connecting the collectors to a —18 volt D.C. power source (not shown) through resistors 100, 101, 102 and 103, respectively, while the bases may be coupled to the —18 volt D.C. power supply through resistors 104, 100, 105 and 102, respectively. A Zener diode 106 is also connected from the power supply side of these resistors to ground to serve as a decoupler.

The emitters of these transistors are connected to ground through resistors 107, 108, 109 and 110, respectively, each of which is connected in parallel with capacitors 111, 112, 113 and 114, respectively. In addition, resistors 115 and 116 are connected in series to ground with resistors 108 and 110, respectively. The voltages developed across resistors 108 and 110 are coupled back to the bases of transistors 93 and 95, respectively, through resistors 117 and 118, respectively, to provide stabilization of the operating point of the transistors.

Power amplifier 119 has a collector connected tuned circuit, including capacitor 120 and the primary 121 of transformer 122, and has the base connected to the collector of transistor 96 through capacitor 123. Secondary 124 of transformer 122 is connected to the bases of push pull amplifiers 125 and 126 to drive the same, while the collector of transistor 119 is connected to a —28 v. D.C. power source (not shown) through winding 121. The base of transistor 119 is connected to the —28 v. D.C. power supply through resistor 127 and to ground through resistor 128, while the emitter is grounded through resistor 129.

Serially connected resistor 130 and thermistor 131 form a voltage divider between the —28 v. D.C. power supply and ground. Secondary 124 is center tapped and connected to the junction of resistor 130 and thermistor 131 so that the base emitter current of transistors 125 and 126 is insensitive to ambient temperature variations. In addition, resistor 132 connects the emitters of transistors 125 and 126 to ground, while negative feedback is provided to the base of transistor 96 through serially connected capacitor 133 and resistor 134.

The output signal from push pull amplifiers 125 and 126 is coupled from the collectors to the shunt servo motor in the control unit through leads 137 and 138 (through leads 1137 and 1138 for the series servo motor), said leads being connected to the push pull amplifiers through diodes 139 and 140, respectively.

Reversible switching means 28 controls the application of the output error signal from the discriminators to the two servo amplifiers. As shown in FIGURE 8, reversible switching means 28 includes a pair of switching relays 143 and 144, each of which includes a relay winding 145 and 146, respectively, controlling the movable contactors of switches 147 and 148–149 respectively. Relay windings 145 and 146 are commonly energized by a negative voltage from control unit 26 coupled through lead 150.

The input error signal from phasing discriminator 32 is coupled through lead 84 to one of the stationary contacts of switch 147 and to one of the stationary contacts of switch 148 (one of which is in engagement with the adjacent movable contactor to the exclusion of the other as shown in FIGURE 8). The other input from phasing discriminator 32 is coupled through input lead 86 to the other stationary contact of switch 148 and to one of the stationary contacts of switch 149. The input from loading discriminator 29 is coupled through lead 66 to the other stationary contact of switches 147 and 149.

The movable contactor of switch 147 is directly connected to the movable contactor of switch 152 of relay 153, which relay includes a relay winding 154 and a second switch 155. The movable contactor of switch 148 is connected to ground as is one stationary contact of switch 152 through capacitor 157, the other stationary contact of switch 152 through resistor 158 and diode 159, the movable contactor of switch 155 through resistors 158 and 160, one stationary contact of switch 162 of relay 163 (which relay includes a relay winding 164 and a second switch 165) through resistor 166, and the movable contactor of switch 165. The movable contactor of switch 149 is connected to the other stationary contact of switch 162, which switch has a diode 167 connected between the movable contactor and said other stationary contact.

Lead 87 to shunt servo amplifier 30 has a bypass capacitor 169 connected in parallel with serially connected resistors 170 and 171 to ground. In addition, lead 87 is also connected to receive an input signal from control unit 26 through lead 172 and serially connected resistors 170 and 173, to said one stationary contact of switch 152 through resistor 175 and capacitor 176 connected in parallel, to the stationary contact of switch 165, and to the movable contactor of switch 177 of relay 178, which relay also includes winding 179 and a second relay actuated switch 180.

Lead 1087 to series amplifier 31 is connected to receive a signal from control unit 26 through lead 182 and resistor 183, to ground through resistor 184, and to the movable contactor of switch 162 through resistor 185 and capacitor 186 connected in parallel.

The movable contactor of switch 180 is grounded and serves to ground input leads 188 and 189 from control unit 26 when winding 179 is not energized, and to ground lead 190 from control unit 26 when winding 179 is energized. Winding 179 is energized by means of input leads 191 and 192 from control unit 26, while winding 154 is energized by lead 193 also from control unit 26 (the other side of winding 154 is grounded). Winding 164 is energized from control unit 26 through leads 150 and 194.

Reversing switch means 28 is intended primarily to govern the application of error signals to the servo amplifiers and the several functions of the switches and relays therein are clarified during the discussion of control unit 26 which follows.

The primary function of control unit 26 is to automatically cause the elements of coupling circuit 20 to be properly repositioned to match the impedance of the output line, or antenna, to that of the input line at a preselected value each time that the frequency of the tunable source 23 is changed. As brought out hereinabove, this tuning, or positioning, of the element of the coupling circuit necessarily requires that the variable series coil, the variable shunt coil, and the variable shunt capacitor be adjusted properly, and that the fixed series capacitor be inserted in the circuit if needed.

In actual tuning, however, it was found in most cases to be desirable, and in many cases mandatory, that the input line be resonated for stray capacitance prior to matching the impedance of the output line thereto. In addition, to achieve tuning in a minimum amount of time (always less than one minute), it was likewise found necessary to avoid sequential tuning of each variable element through its entire range. Thus control unit 26 was therefore developed with these ends in mind.

From the foregoing it should be readily appreciated that the control unit must program the entire tuning operation. This has been accomplished through the use of a plurality of programing switches 198. By providing circuitry to cause the programing switches to move from position to position, tuning is, of course, accomplished by proper connection of circuitry to proper stationary and movable contacts in the programing switches.

As shown and described herein, each programing switch has sixteen stationary contacts (this being a standard commercially available type of switch) and a movable contactor or rotor shaped to meet the particular need. It is to be noted, however, that no programing switch requires all stationary contacts and this invention is not meant to be limited to such a switch. In fact, the complete tuning cycle described hereinafter is of nine steps and would therefore require no more than ten stationary contacts (if one such contact served to constantly engage the rotor). Moreover, it is to be appreciated that the tuning steps described, while preferred, are not meant to constitute a limitation of the present invention.

Figure 3:
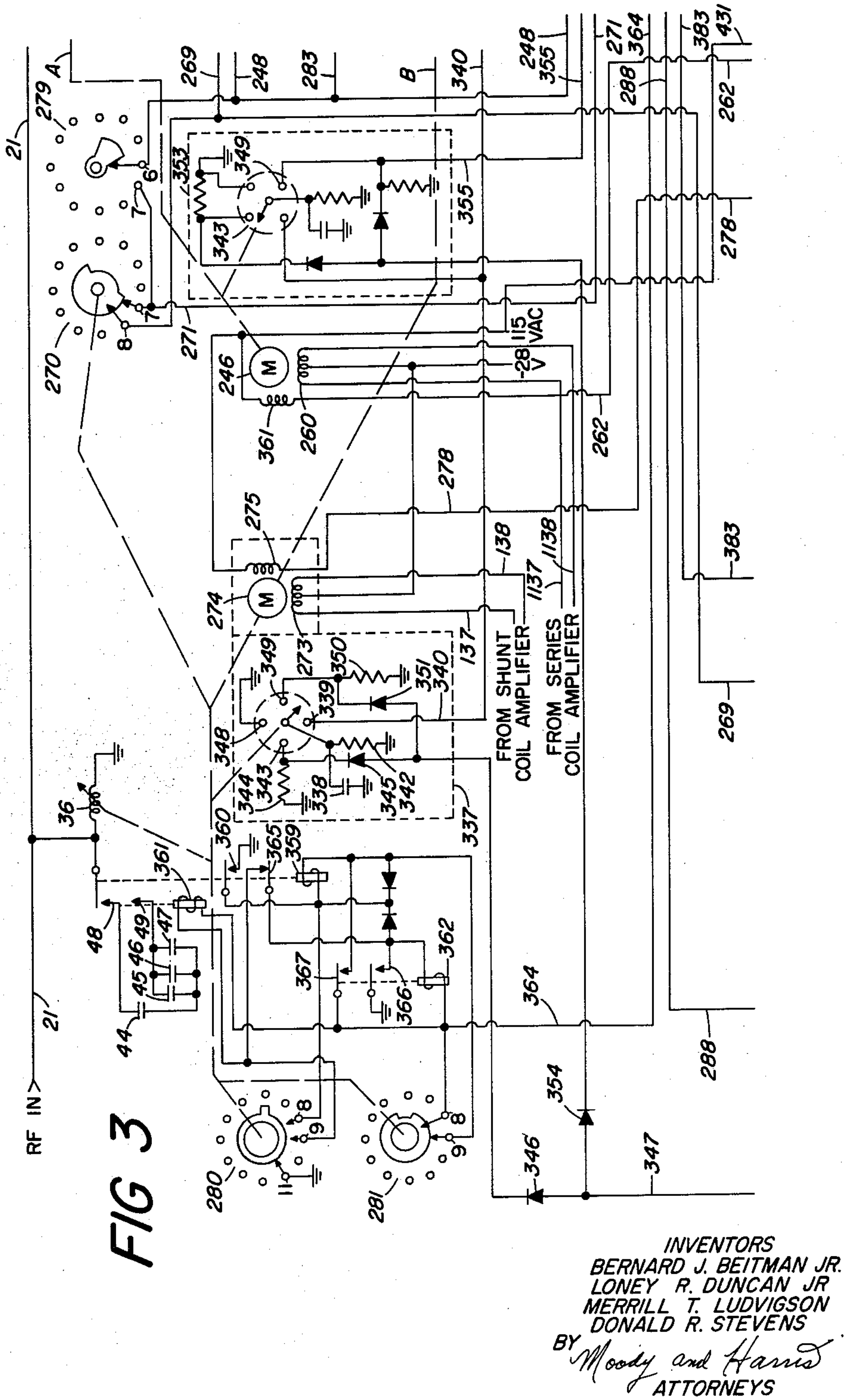
Figure 4:
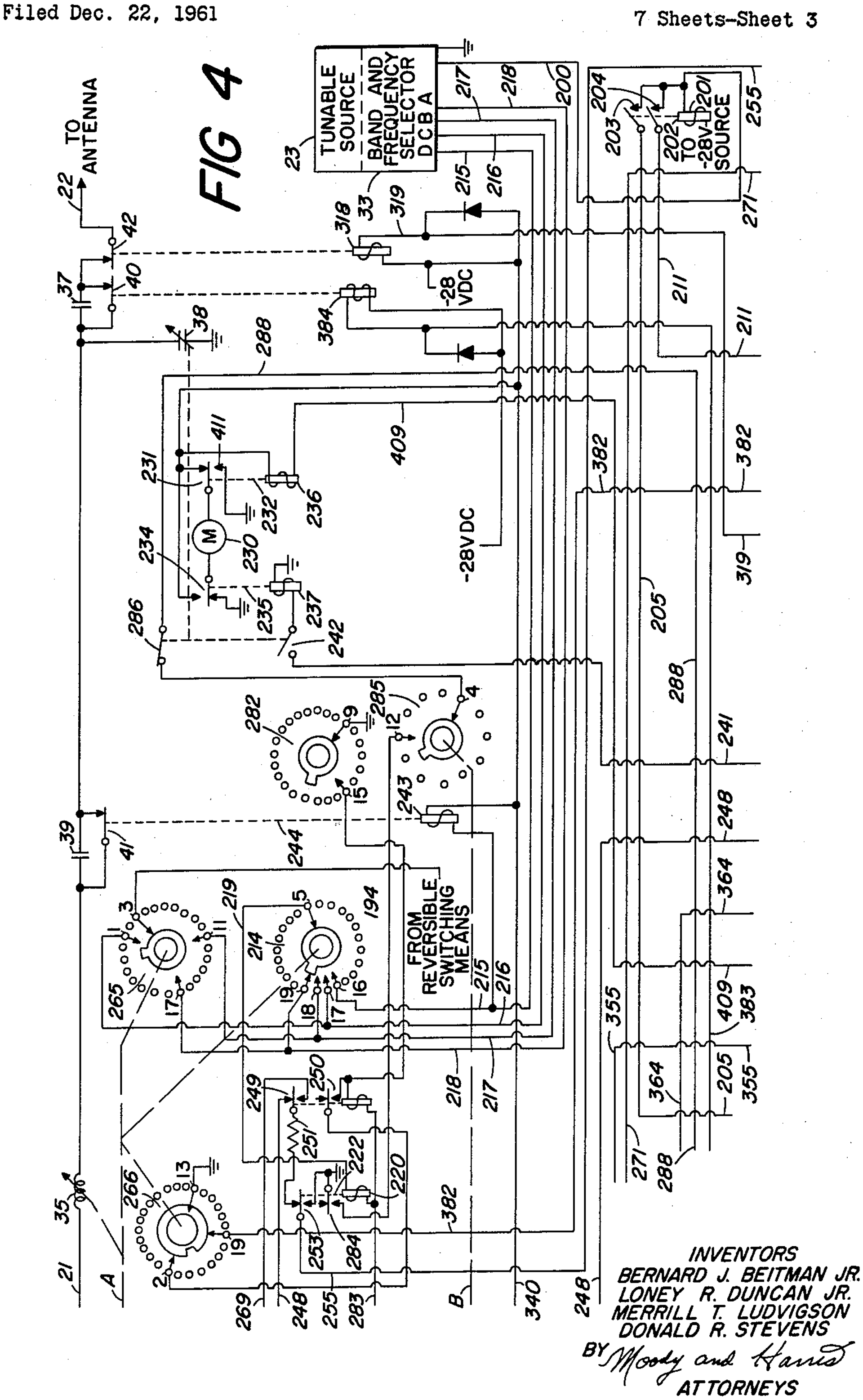
Figure 5:
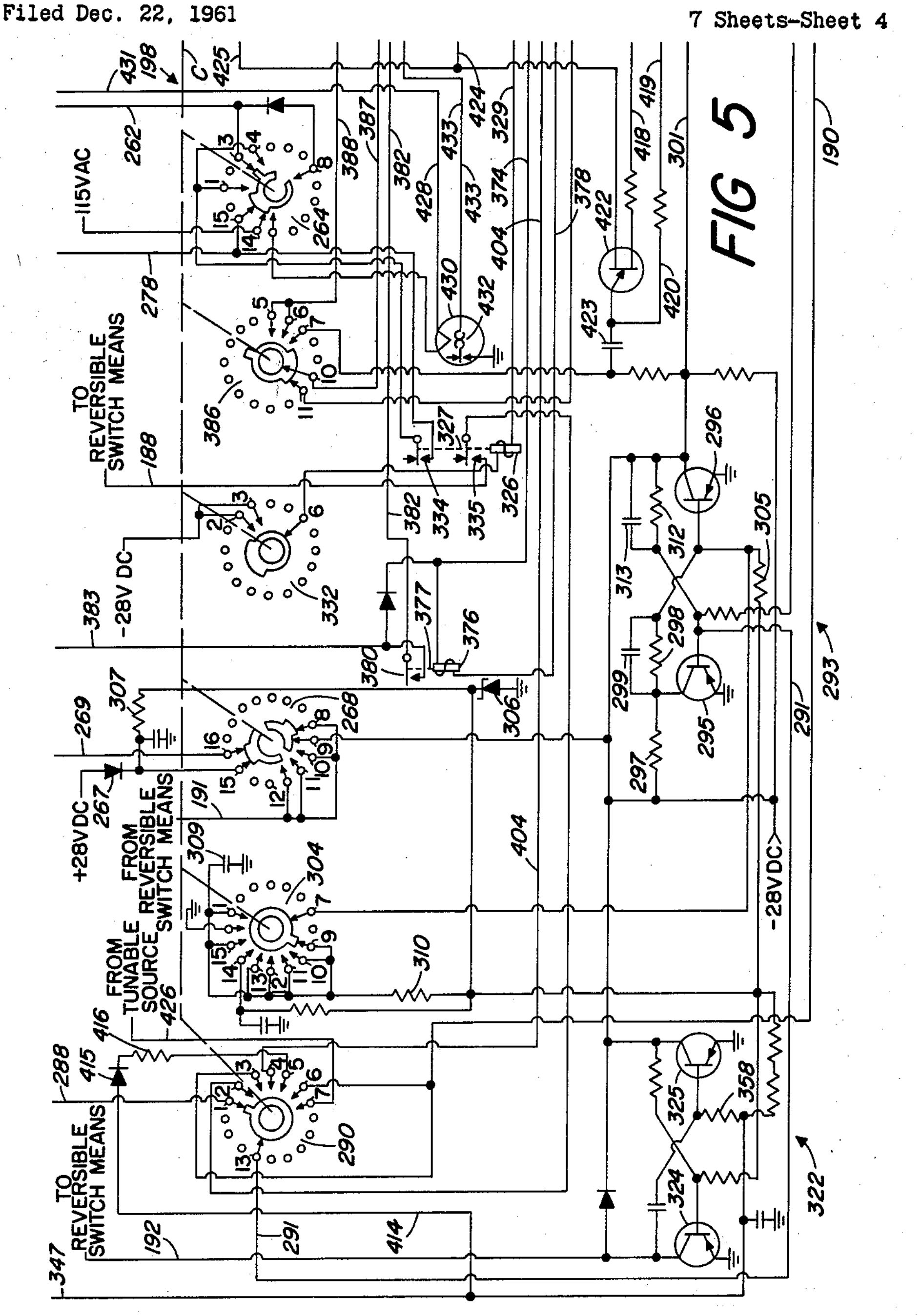
Figure 6:
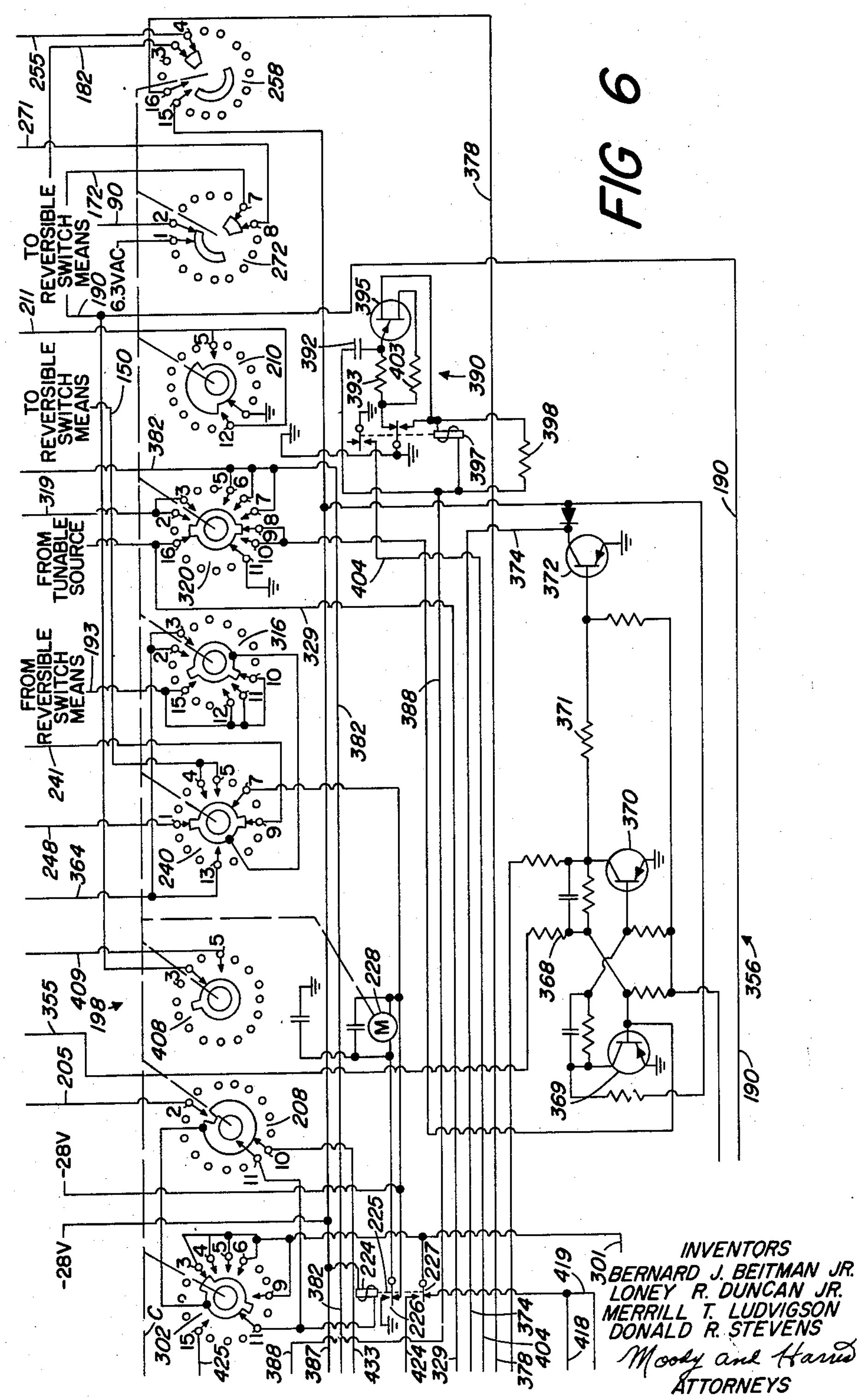

As shown in FIGURES 3 through 6, in matching the impedance of the output line to that of the input line, programing switches 198 are caused to initially assume a first, or homing position, and then caused to advance clockwise (as shown in FIGURES 5 and 6) one step to the adjacent stationary contact. The programing switches are advanced through eight steps for a complete tuning cycle, with a ninth step provided in case of equipment fault indicated by failure to complete the tuning cycle within one minute. As indicated by the drawings, the rotors of all programing switches are constrained to common rotation and may, in fact, all be mounted on a common drive shaft (not shown) as is conventional.

The antenna coupling and matching network of this invention once matched for a particular frequency need not be repositioned until a new frequency is selected. Since this selection must be made at the tunable source, information to this effect must be coupled to the control unit in order to start a tuning cycle. After the new frequency selecting information is received, the programing switches of this invention are caused to be automatically advanced through the steps of the tuning cycle, needing only an external signal from the tunable source to indicate that it is ready for tuning and later that it is ready for normal operation.

The nine positions of the programing switches are as follows:

Position 1—Homing
Position 2—RF ON
Position 3—Stray Capacitance Tuning
Position 4—Initial Tuning
Position 5—Intermediate Tuning
Position 6—Final Tuning
Position 7—High Power
Position 8—Operate
Position 9—Fault

*Homing Position*

As stated hereinabove, the coupling and matching network of this invention need be repositioned, once tuned, for a selected frequency, only when a change of frequency occurs. When a new frequency is selected at the tunable source by means of the band and frequency selector, a ground must be supplied therethrough to control circuit 26. This may be accomplished in any conventional manner, such as, for example, by a switch connected with the selector switch to apply a temporary ground whenever the movable contactor of the selector switch is moved to select a new frequency or by a conventional switch manually operated by the operator of the equipment.

This ground is coupled by means of lead 200 to winding 201 of relay 202 (shown in FIGURE 4) to energize the winding since the other side is constantly connected to a —28 volt D.C. power source (not shown). Energization of relay winding 201 closes relay actuated switches 203 and 204 so that the ground is thereafter coupled through lead 205 to programing switch 208 (contact 2).

Programing switch 208 is shown in FIGURE 6 in the homing, or first position, for reference purposes, as are all of the other programing switches shown in the drawings.

Since the ground from tunable source 23 may be temporary in nature, switch 204 acts to latch relay 202 by maintaining winding 201 energized by supplying a ground through programing switch 210 (contacts 5, 11 and 12) and lead 211. As can be seen from FIGURE 6, the latch is released when the program switches reach the homing position.

In the homing position the elements of coupling circuit 20 are prepositioned with the fixed series capacitor 37 out of the circuit, shunt variable capacitor 38 at minimum capacitance, shunt inductor 36 essentially at maximum inductance, and series inductor 35 at a predetermined intermediate point. Where the frequency range covered is relatively large, it has been found preferable to divide the frequency range into a number of bands and to position the series inductor to exhibit a predetermined minimum of inductive reactance at the lowest frequency of the band selected, preferably 25 ohms.

It is a feature of this invention that impedance matching can be achieved over a broad range of frequencies, specifically 2–30 megacycles, and these frequencies have been divided into four bands as follows:

Band A—2 to 4 megacycles
Band B—4 to 8 megacycles
Band C—8 to 16 megacycles
Band D—16 to 30 megacycles It is to be realized, of course, that these bands might be varied as desired as would be obvious to one skilled in the art.

The band and frequency selector of tunable source 23 must supply an indication of the band chosen for initially positioning series coil 35 at the desired homing position point. This may be done conventionally by supplying a ground to the lead indicating the band selected and may be accomplished, for example, by a simple switch constrained to movement with the band and frequency selector to ground the proper lead determined by the frequency selected.

As shown in FIGURE 4, this ground is coupled to control unit 26, and more particularly, to the stationary contacts of multiposition switch 214. As shown, lead 215 is connected to contact 16 of switch 214 to couple a ground thereto if a frequency in band D is selected, lead 216 is connected to contact 17 to couple a ground thereto if the frequency in band C is selected, lead 217 is connected to contact 18 to couple a ground thereto if a frequency in band B is selected, and lead 218 is connected to contact 19 to couple a ground thereto if a frequency in band A is selected. The rotor of switch 214 is connected by means of lead 219 to one side of winding 220 of relay 222.

The ground coupled from tunable source 23 through lead 200, switch 203, lead 205, and programing switch 208 (contact 2) will, as shown in FIGURE 6, complete a circuit through programing switch 208 at all times until the switches reach the homing position since the rotor (which is notched to open with contact 2 in only one position) of programing switch 208 is constantly connected through contact 11 and winding 224 of relay 225 to the —28 volt D.C. power source. The energization of relay 225 causes switches 226 and 227 to assume relay actuated positions (opposite to that as shown in FIGURE 3). This couples a ground through switch 226 to motor 228 to ground one side of the motor to energize the same since the other side of the motor is connected to the —28 volt D.C. power source.

Motor 228 is linked to the rotors of the programing switches to drives the same and the motor therefore causes the rotors to be rotated to the homing position.

When the rotor of programing switch 208 reaches the homing position, the rotor breaks engagement with contact 2 to open the circuit and stop motor 228 since this de-energizes relay winding 224. In addition, when the rotor of programing switch 210 reaches the homing position, the rotor breaks engagement with contact 12 to de-energize winding 201 of relay 202. Dynamic braking is provided for motor 228 when switch 226 resumes its relay de-energized position (as shown in FIGURE 6).

With programing switches 198 in homing position, the tuning elements are then caused to be moved to their predetermined homing positions. Motor 230 (FIGURE 4) is connected at one side to the —28 volt D.C. power supply through a switch 231 of relay 232 and to ground at the other side through switch 234 of relay 235 when relay windings 236 and 237 are de-energized and energized, respectively. Relay winding 237 is energized when the rotor of programing switch 240 reaches the homing position since the rotor is connected through contact 7 to the —28 volt D.C. source and contact 9 is connected to relay winding 237 through lead 241. Motor 230 is connected to shunt capacitor 38 and drives the same to minimum capacitance (maximum capacitive reactance). When capacitor 38 reaches minimum capacitance, motor 230 opens switch 242 to de-energize winding 237 of relay 235. The resulting application of a short across motor 230 provides dynamic braking.

If a frequency in band D is selected, it becomes necessary that series capacitance be inserted in the coupling circuit for matching purposes. The ground from tunable source 23 for band D on lead 215 is also connected to one side of winding 243 of relay 244. Since the other side of winding 243 is connected to the —28 volt D.C. power supply, winding 244 is energized causing switch 41 to open which inserts capacitor 39 into the coupling circuit in series. If a frequency in bands A, B or C is selected, of course, switch 41 remains closed and capacitor 39 is shorted and hence not in the coupling circuit.

Series coil 35 is to be driven, as brought out hereinabove, to a position for homing where it offers 25 ohms of inductive reactance at the lowest frequency of the band selected. Alternating current motor 246, which drives series coil 35, may be driven to the homing position by coupling the —28 volt D.C. power through programing switch 240 (contacts 7 and 1), lead 248, switch 249 of relay 250, resistor 251, switch 253 of relay 222, lead 255, programing switch 258 (contacts 3 and 4), lead 182, resistor 183, lead 1087, series servo amplifier 31, and leads 1137–1138 to one winding 260 of motor 246. The other winding 261 of motor 246 is directly connected to one side of a 115 volt A.C. source and to the other side of said source through lead 262 and program switch 264 (contacts 3 and 14).

The rotors of limit switch 265, latching switch 266, and band switch 214 are tied to motor 246. When the rotor of switch 214 reaches the position where a ground is coupled therethrough for the band selected (for example, when the rotor of switch 214 engages contact 19 for band A) relay winding 220 is energized. This applies a ground through switch 253 of relay 222, lead 255, programing switch 258, lead 182, resistor 183 and lead 1087 to ground the series servo amplifier input to thus stop motor 246. As brought out hereinabove, switch 214 is positioned so as to adjust coil 35 to have 25 ohm inductive reactance at the lowest frequency of the band selected (for band A, for example, this would be at two megacycles).

A positive 28 volt D.C. power source may be utilized to drive shunt coil 36 to maximum inductance by coupling this voltage through diode 267, programing switch 268 (contacts 15 and 16), lead 269, multiposition switch 270 (contacts 8 and 7), lead 271, programing switch 272 (contacts 7 and 8), lead 172, resistors 173 and 170, lead 87, shunt servo amplifier 30, and leads 137–138 to motor winding 273 of alternating current motor 274. Motor winding 275 of motor 273 has one side directly connected to the 115 volt A.C. power supply and the other connected to the other side of said supply through lead 278 and programing switch 264 (contacts 15 and 14). Motor 274 controls the adjustment of shunt coil 36 and the rotors of multiposition switches 270, 279, 280 and 281. The shunt servo amplifier drives motor 274 until coil 36 is at, or near, its maximum inductance position, at which point switch 270 breaks the servo input circuit.

In order to minimize driving the inductors, the +28 volt D.C. power supply is coupled to the series servo amplifier (rather than the —28 volt D.C. power supply as described hereinabove) if the rotor of switch 282 engages contact 15 (the rotor of switch 282 is linked to motor 246). This couples a ground to the winding of relay 250 to energize the same (through lead 283 to lead 248 to —28 volt D.C. power supply) and causes switch 249 to assume a relay actuated position. This connects the +28 volt D.C. power supply (through switch 270) to resistor 251 and lead 255 (to the series servo amplifier) and disconnects the —28 volt D.C. power supply. In like manner, the —28 volt D.C. power supply can be connected to the shunt servo amplifier. This occurs if the rotor of switch 279 engages contact 7 rather than the rotor of switch 270 engaging contact 7. In the former case, +28 volt D.C. power is coupled to the shunt servo amplifier while in the latter case —28 volt D.C. power is coupled to the shunt servo amplifier.

When all of the variable components have thus reached their predetermined homing positions, that is, with shunt coil 36 at maximum inductance, series coil 35 at 25 ohm inductive reactance for the lowest frequency of the band selected, shunt capacitor 38 at minimum capacitance (maximum reactance) and switch 40 closed so that capacitor 37 is not in the coupling circuit, the programing switches are ready to be advanced to the second, or RF ON, position.

*RF ON Position*

Programing switches 198 are advanced from the homing position to the RF ON position through an interlock system by coupling a ground through switch 284 of relay 222 (relay 222 having been energized by the rotor of multiposition switch 214 reaching the predetermined stationary contact for the frequency band selected) multiposition switch 285 (the rotor of which switch is constrained to rotation with motor 274), switch 286 (which is closed by motor 230 when shunt capacitor 38 reaches a position of minimum capacitance), lead 288, program switch 290 (contacts 1 and 13) (FIGURE 5), and lead 291 to bistable multivibrator 293.

Bistable multivibrator 293 may be conventional and has lead 291 coupled directly to the base of transistor 295, which transistor is biased so that it starts to conduct before transistor 296 (of the multivibrator) when power is initially applied. When all of the switches of the interlock system (referred to hereinabove) are closed and the ground is coupled to the base of transistor 295, this causes the multivibrator to assume its other stable state since transistor 295 is cut off.

As transistor 295 cuts off, its collector voltage becomes more negative because of a decreased voltage drop across resistor 297, and this negative going voltage is coupled to the base of transistor 296 through resistor 298 and capacitor 299 connected in parallel. The emitter of transistor 296 is grounded and the negative going voltage impressed upon the base causes transistor 296 to conduct which, in turn, causes its collector voltage to approach zero so that there is very little voltage drop from the emitter to collector. The resulting ground is coupled through lead 301 and programing switch 302 (contacts 3 and 11) to relay winding 224 to energize relay 225. Energization of relay 225 (FIGURE 6) causes switch 226 to assume its relay actuated position to energize motor 228 which causes the rotors of programing switches 198 to advance (clockwise as shown in the drawings). As the rotors turn, the ground is removed from the base of transistor 295 since the interlock circuit is broken but, since the multivibrator is bistable, transistor 295 remains cut off.

Programing switch 304 is also connected to bistable multivibrator 293, and has contact 7 connected to the base of transistor 296, which base is biased to +6 volts through resistor 305 (the +6 volt supply being available because of Zener diode 306 connected between ground and the +28 volt power supply through resistor 307 and diode 267). Since the rotor of programing switch 304 is constrained to rotation with motor 228, the rotor breaks engagement with contact 9 when motor 228 is energized and this causes capacitor 309 to begin to charge towards +6 volts since the resistor is connected to the +6 volt power through resistor 310.

When the rotor of programing switch 304 makes contact with pin 10, however, the positive charge on capacitor 309 is coupled directly through switch 304 to the base of transistor 296 of multivibrator 293. This causes transistor 296 to be cut off and the negative going potential at the collector of transistor 296 is coupled to the base of transistor 295 through resistor 312 and capacitor 313, causing transistor 295 to again become conductive. When transistor 296 is cut off, this removes the ground from relay winding 224 causing relay actuated switch 226 to be released. This grounds the motor and again provides dynamic braking.

All of the programing switches 198 having been moved one position clockwise from that shown in the drawings, these switches are now in the RF ON position. In this position, relay winding 154 (FIGURE 8), which is grounded at one side, has the —28 volt power supply coupled thereto through lead 193, program switch 316 (contact 15) and program switch 240 (contact 7) (the rotors of program switches 316 and 240 are electrically connected).

The energization of relay winding 154 causes switches 152 and 155 to be moved to relay actuated positions (opposite to that shown in FIGURE 8) to connect the output from phase discriminator 32 to shunt servo amplifier 30 through reversible switch means 28. In addition, relay winding 318, which has one side connected to the —28 volt power supply, has its other side grounded through lead 319 and programing switch 320 (contacts 2 and 11). The energization of winding 318 opens switch 42 and disconnects the output line 22 and antenna 24 from the input line 21.

Monostable multivibrator 322, like multivibrator 293, has a pair of transistors 324 and 325, the former of which is normally maintained in a conductive state and the latter of which is normally maintained in a non-conductive state. The collector of transistor 324 is connected by lead 192 to one side of relay winding 179 in reversible switching means 28, while the other side of winding 179 is connected through lead 191 and programing switch 268 (contacts 8 and 9) to the —28 volt power supply. Thus, in the RF ON position, relay winding 179 is energized whenever the collector of transistor 324 is essentially at ground potential, which is the case so long as transistor 324 remains in a conductive state. In this state, switch 180 is caused to connect lead 190 to ground, while in the nonconductive state, switch 180 couples a ground to leads 188 and 189.

The coupling and matching network must remain in the RF ON position until such time as tunable source 23 is capable of producing a signal of sufficient magnitude for tuning to be accomplished. This information may be supplied from the tunable source to the control unit in the form of a conventional ground to indicate readiness. This ground is coupled to winding 326 of relay 327 through leads 328 and 329. The other side of winding 326 is connected to the —28 volt power supply through programing switch 332 (contacts 6 and 2). The energization of relay winding 326 closes switch 334 and switch 335. Closing of switch 334 applies the 115 volt power supply through program switch 264 (contacts 14 and 1), switch 334 and lead 278 to the winding 275 of shunt coil motor 274. The application of A.C. power to the fixed phase of the shunt coil drive motor 274 allows the drive motor to start and causes sensor 337 to produce a negative voltage output. Power is also connected to the chopper circuit of the servo amplifier through lead 90 and programing switch 272 (contacts 1 and 2).

Sensor 337 is a motion and direction sensing device capable of producing a first output voltage due to rotation of the motor shaft that indicates motion and a second output voltage on a separate output terminal to indicate direction of motion. As shown in the drawing in equivalent fashion (a commutator and brushes have been found preferable), a wiper arm moving clockwise causes capacitor 338 (connected to the wiper arm) to be charged to —28 volts when the wiper arm makes with contact 339, which contact is connected to a source of —28 volts through lead 340. As the wiper arm continues to move clockwise, capacitor 338 starts to discharge through resistor 342 connected in parallel therewith. Then as the wiper arm engages contact 343, the capacitor discharges through resistor 344 connected between contact 343 and ground.

The voltage developed across resistor 343 is coupled through diode 345, diode 346 and lead 347 to monostable multivibrator 322. When the wiper arm engages contact 348, capacitor 338 is fully discharged to ground so that when it later engages contact 349 there, of course, can be no voltage developed across resistor 350 (connected between contact 349 and ground) to be coupled through diode 351 and lead 347 to bistable multivibrator 322.

It is to be realized, of course, that had the wiper arm been moving in the opposite direction the voltage would have been developed across resistor 350 and not across resistor 344. It should be noted that capacitor 338 is not allowed to fully discharge through resistor 342 prior to engaging the next contact.

Sensor 353 is connected to motor 246, and may be identical to that of sensor 337 and has a motion sensing output taken from contacts 343 and 349 through diode 354 to lead 347. Unlike sensor 337, however, sensor 353 includes a direction sensing output coupled from contact 349 through lead 355 to bistable multivibrator 356.

Sensors 337 and 353 form the basic subject matter of copending United States patent application Serial Number 161,445, filed December 22, 1961, entitled "Motion and Direction Sensing Device," inventors Raymond C. Beason et al., and assigned to the assignee of the present invention, which application may be referred to for a more detailed explanation.

The output signal produced by sensor 337 is coupled to the base of transistor 325 of multivibrator 322 through resistor 358 causing the transistor to conduct. Transistor 325 is normally non-conductive and thus when rendered conductive cuts off transistor 324 in the same way as described hereinabove with respect to bistable multivibrator 293. When transistor 324 is cut off, relay 178 (in reversible switching means 28) is de-energized causing the relay switches to couple a ground through leads 188 and 189 and remove the ground from lead 190.

The ground on lead 188 is coupled through switch 335 of relay 327, programing switch 290 (contacts 2 and 13) and lead 291 to the base of transistor 295 of multivibrator 293. As described hereinabove, the ground coupled to the base of transistor 295 causes the transistor to be cut off and causes transistor 296 to conduct energizing relay winding 224 to cause motor 228 to advance the programing switches 198 from the RF ON position to the Stray Capacitance Tuning Position (Position 3).

*Stray Capacitance Tuning Position*

The output error signal from the phasing discriminator now drives shunt coil 36 through the reversible switching means 28, shunt servo amplifier 30, and motor 274 in control circuit 26. The output error signal from the phasing discriminator drives shunt coil 36 until the stray capacitance of the input line is parallel resonated.

If these strays are small, coil 36 will be driven toward minimum inductance and will be able to resonate. If the strays are large, however, and coil 36 is driven towards maximum inductance, near maximum position limit switch 280 applies a ground to relay winding 359 which closes switch 48 to couple capacitor 44 to ground in parallel with coil 36. The energization of winding 359 also closes relay actuated switch 360 to latch winding 359 energized.

If coil 36 is still driven toward maximum, however, the rotor of multiposition switch 280 will break with contact 8 and make with contact 9, which energizes relay windings 361 and 362 through lead 364 and programing switches 316 and 240 (contacts 3 and 7, respectively). Switch 281 opens the voltage supply circuit to winding 361 to unlatch winding 359 and supplies ground through switch 365 to winding 362. Winding 362 is latched by switch 366 and switch 367 allowing the power supply to be connected to winding 359. The effect of this is to close switch 49 to insert capacitors 45, 46, and 47 in parallel with shunt coil 36. These capacitors are selected to be of a size that insures that the shunt coil 36 will be driven toward minimum inductance thereafter to parallel resonate the stray capacitance of the input line.

While shunt coil drive motor 274 is operating, a voltage output is produced by means of sensor 337 and coupled through lead 347 to the base of transistor 325 keeping it conductive. When the stray capacitance is resonated, however, motor 274 stops since the phasing error signal has been eliminated. This, in turn, means that the negative voltage is no longer coupled to the base of transistor 325 and it is therefore rendered nonconductive and its collector potential goes up to approximately −28 volts. This negative voltage is coupled to the base of transistor 324 causing it to conduct so that its collector approaches ground potential, which ground is coupled through lead 192 to relay winding 179, which winding has its other side connected to the −28 volts D.C. power supply through lead 191 and programing switch 268 (contacts 10 and 9).

The energization of winding 179 causes ground to be coupled to lead 190 by closing switch 180, and this ground is coupled through lead 190, programing switch 290 (contacts 3 and 13) and lead 291 to multivibrator 293. As described hereinabove, the application of a ground to the base of transistor 295 of multivibrator 293 causes the multivibrator to switch which, in turn, causes the programing switches 198 to advance to the fourth position, that is, the Initial Tune Position. The energization of relay winding 179 also caused switch 177 to be closed which opens the connection between the phasing discriminator and the shunt coil servo amplifier.

*Initial Tuning Position*

When the rotors of programing switches 198 advance to the Initial Tuning Position (programing switches 198 three positions clockwise from the homing position as shown in the drawings), shunt coil 36 is disconnected from the phasing discriminator through the reversing switch means 28. In addition, relay winding 318 is deenergized when the rotor of program switch 320 advances to the Initial Tuning Position since this removes the ground coupled to the relay through lead 319. As a result, switch 42 again closes and this reconnects the output line to the input line.

In the initial tuning position, relay windings 145 and 146 of reversible switch means 28 are connected to the −28 volt power supply through lead 150 and program switch 240 (contacts 4 and 7). Energization of relay windings 145 and 146 causes switches 147, 148 and 149 to assume their relay actuated positions (opposite to that shown in FIGURE 8), and this connects the output of the phasing discriminator to the input of the series coil servo amplifier.

The output error signal from the phasing discriminator drives series coil 35 through reversing switch means 28, series servo amplifier 31 and motor 246. Motor 246 is driven in a direction dependent upon whether the error is capacitive or inductive since the error signal drives motor 246 in a direction that will series resonate the antenna (assuming the output line terminates as an antenna).

If the phasing discriminator senses a capacitive error, series coil 35 is driven towards maximum inductance to series resonate the antenna. If there is an inductive error, however, series coil 35 will be driven toward minimum inductance. This direction of motion is sensed by sensor 353, as explained hereinabove, and an output signal from sensor 353 is coupled through lead 355 and resistor 368 to the base of transistor 369 of bistable multivibrator 356. Multivibrator 356 is similar in operation to that of multivibrator 293 and transistor 369 is initially nonconductive while transistor 370 is initially conductive.

Thus, the signal coupled to the base of transistor 369 (due to the sensed inductive error) causes transistor 369 to become conductive which, in turn, cuts off transistor 370. When transistor 370 becomes nonconductive, its collector voltage rises to about −28 volts and negative going voltage is coupled through resistor 371 to the base of transistor 372 causing this transistor to conduct. Conduction of transistor 372 causes its collector potential to drop approximately to ground, which ground serves, through lead 374, to energize relay winding 376 of relay 377, the other side of which winding is connected to the −28 volt D.C. power supply through lead 378 and programming switch 258 (contacts 16 and 15).

Energization of relay winding 376 causes relay switch 380 to close. This couples a ground from latching switch 266 (contacts 13 and 19), and lead 382, switch 380 and lead 383 to relay winding 384, the other side of which relay winding is connected to the −28 volt power supply.

The energization of relay winding 384 opens switch 40 and inserts series capacitor 37 into the coupling circuit. Since sensor 353 responded immediately, series capacitor 37 is inserted, if needed, almost immediately after series coil 35 started to vary toward minimum inductance in an attempt to series resonate the antenna.

If, after capacitor 37 is inserted into the line, series coil 35 is still urged toward minimum inductance and reaches its minimum limit without being able to series resonate the antenna, latching switch 266, the rotor of which is constrained to partake of all motion of the motor shaft of motor 246, will break the ground connection to de-energize relay 384 and this causes switch 40 to close and remove the series capacitor 37 from the coupling circuit.

When the programming switches first rotated into the Initial Tuning Poistion, the −28 volt D.C. power was coupled through lead 387, programing switch 386 (contacts 10 and 5) and lead 388 to time delay circuit 390 and more particularly, to capacitor 392 therein. Capacitor 392 charges through resistor 393 until the firing potential of unijunction transistor 395 is reached. When unijunction transistor 395 fires, capacitor 392 discharges through relay winding 397 and resistor 398 to energize the former.

Energization of relay winding 397 causes relay switches 400 and 401 to assume relay actuated positions (opposite to that shown in FIGURE 6), and this removes the ground from resistors 393 and 403 and couples a ground through lead 404, program switch 290 (contacts 4 and 13) and lead 291 to the base of transistor 295 of bistable multivibrator 293. As described hereinabove, the application of a ground to the base of transistor 295 causes the bistable multivibrator to change state which, in turn, causes motor 228 to be energized to switch the programing switches 198 to the fifth, or Intermediate Tuning Position. Thus, it can be seen that the initial tuning step is permitted to endure only for a predetermined short period of time sufficient to sense whether series capacitance is needed and to either run series inductor 35 to minimum inductance or to series resonate the antenna.

*Intermediate Tuning Position*

If series coil 35 is driven by motor 246 until it hits its end stop without series resonating the antenna, shunt capacitor 38 is caused to be driven by its motor 230 towards maximum capacitance until series coil 38 backs off its end stop and is able to reduce the phasing error to zero.

When series coil 35 hits its end stop, sensor 353 no longer produces a motion indicating signal on lead 347. This causes transistor 325 of bistable multivibrator 322 to be cut off and causes transistor 324 to conduct. Conduction of transistor 324 supplies a ground at its collector through lead 192 to relay winding 179 of reversible switch means 28 to energize the winding and thus ground lead 190 through switch 180. This ground is coupled through lead 190, programing switch 408 (contacts 3 and 5), and lead 409 to relay winding 236 to energize the same. Energization of relay winding 236 causes switch 411 to assume its relay actuated position and this grounds motor 230 at the proper side to cause the motor to drive shunt capacitor 38 towards maximum capacitance.

Switch 177 is also closed when relay winding 179 is energized and this connects the loading discriminator output to the shunt servo amplifier through the reversing switch means. The loading discriminator is centered about a predetermined desired loading impedance usually that of the tunable source, in this case 50 ohms. The output from loading discriminator 29 is therefore positive if the impedance is greater than 50 ohms and negative if less than 50 ohms.

Diode 159 (connected in series in the loading discriminator-shunt series amplifier path in the reversing switch means 28) is connected so that there can be no input to the shunt servo amplifier if the output from the loading discriminator is positive. Thus, if the loading impedance is greater than 50 ohms so that no output is coupled to the shunt coil servo amplifier, motor 230 will continue to run and drive shunt capacitor 38 until series coil 35 and shunt capacitor 38 resonate the antenna with an impedance no greater than 50 ohms.

When the antenna is resonated with an impedance no greater than 50 ohms, diode 159 conducts and the error signal output is coupled from loading discriminator 29 through the reversing switch means to the shunt coil servo amplifier. This, of course, causes motor 274 to drive shunt coil 36. This, in turn, causes sensor 337 to develop a motion indicating signal that is coupled through lead 347, lead 414, diode 415, resistor 416, program switch 290 (contacts 5 and 13) and lead 291 to the base of transistor 295 of bistable multivibrator 293. As brought out hereinabove, a signal coupled to the base of transistor 295 causes the multivibrator to change state which results in motor 228 running to drive the programing switches 198 to the Final Tune Position (Position 6).

*Final Tune Position*

When the programing switches 198 have advanced to the final tuning stage, the —28 volt D.C. power is removed from latched relays 351, 361, and 362, which removes shunt capacitors 44 through 47, which capacitors may or may not have been needed during stray capacitance tuning.

As programing switches 198 are advanced to the Final Tune Position, relay windings 145 and 146 are de-energized by the movement of the rotor of programing switch 240 which disconnects these windings from the —28 volt power supply. This causes switches 147, 148 and 149 to change position (to the positions shown in the drawings) which results in reconnecting the loading discriminator output to the series coil servo amplifier and the phasing discriminator output to the shunt coil servo amplifier.

The error signal due to phasing error is now used to drive the shunt coil 36 while the error signal due to loading error is used to drive the series coil 35. In the Final Tune Position, these coils are now driven until the error signals are eliminated in both discriminators.

While the coils are being driven, sensors 337 and 353 couple a motion indicating signal through lead 347 to multivibrator 322. When the signal terminates, the multivibrator changes state by causing transistor 325 to stop conducting. When transistor 324 starts conducting, a ground is coupled from its collector to relay winding 179 through lead 192 to energize the winding and thereby couple a ground through lead 190 and programing switch 290 (contacts 6 and 13) and lead 291 to multivibrator 293. Multivibrator 293 changes state and the collector voltage of transistor 296 drops to approximately ground potential.

This ground is coupled through switch 227 of relay 225 and leads 418 and 419 to time delay circuit 420, which delay circuit includes a unijunction transistor 422. Capacitor 423 connected to the emitter of unijunction transistor 422 starts to charge to —28 volts through program switch 386 (contacts 7 and 10). Unijunction transistor 422 is also connected through leads 424 and 425 to programing switch 302 (contacts 3 through 6 and 15). When the firing potential of unijunction transistor 422 is reached, capacitor 423 discharges through relay winding 224 (through programing switches 264 and 302) to energize the relay winding. This causes motor 228 to drive the programming switches 198 to the High Power Position.

*High Power Position*

In the High Power Position, the tuning elements of the coupling circuit need not be varied. To assure against movement of coils 35 and 36, power is removed from the fixed phase windings of the coil motors 246 and 274. This is accomplished when programing switch 264 advances to the seventh, or High Power Position.

The programing switches 198 remain in the High Power Position until the tunable signal source has been fine tuned to satisfaction, at which time a ground is sent, in conventional manner, from the tunable source to control unit 26 to indicate that the tunable source has been fine tuned. This may be accomplished conventionally, and, if desired, manually by the operator closing a grounding switch (as could the other signals to the control unit from the tunable source). The ground from the tunable source is coupled through lead 426, programing switch 290 (contacts 7 and 13) and lead 291 to the base of transistor 295 of bistable multivibrator 293 to cause the multivibrator to change state. This, as brought out hereinabove, causes programing switches 198 to be advanced to the eighth, or Operate Position.

*Operate Position*

In the Operate Position, the tuning elements remain, of course, unchanged, the match at the selected frequency having been made. The programing switches will thus remain in the Operate Position until such time as a new frequency is selected which, as brought out hereinabove, starts a new tuning cycle.

*Fault Position*

When the new frequency was first selected and the coupling and matching network of this invention started to match the impedance of the output line to that of the input line, one side of time delay relay 430 was connected to the 115 volt A.C. source through programing switch 264 (contacts 13 and 14) (the other side being connected to the other side of the 115 volt A.C. source through lead 431). If the entire tuning operation is not completed within the one minute time allocation, a ground is coupled through the time delay switch 432, lead 433 and programing switch 208 (contacts 10 and 11) to energize relay winding 224 which results in motor 228 driving programing switches 198 to the Fault Position (that is, until a rotor of program switch 208 breaks with contact 10).

If the programing switches reach the Operate Position, however, before the one minute expires, programing switch 264 breaks the 115 volt circuit to the time delay relay since the notch of the rotor is aligned with contact 13 in the Operate Position. If the programing switch should be driven to Fault Position, the tuning cycle must, of course, be again started from the beginning.

In view of the foregoing, it should be obvious to one skilled in the art that the coupling and matching network of this invention provides an improved means for positively matching the impedance of an input line to that of an output line in a minimum amount of time.

What is claimed as our invention is:

1. A network for matching the electrical impedance of an output line to an input line, said network comprising: an input line adapted to receive signals over a predetermined range of frequencies; an output line that is to be matched to said input line at a particular frequency within said predetermined range of frequencies; a variable coupling circuit for coupling said input line to said output line and varying the impedance of the latter, said coupling circuit including series connected reactance means and shunt connected reactance means, said reactance means inluding both capacitive and inductive elements; a phasing discriminator connected to said input line and producing an output signal proportional to deviation in phase of voltage and current; a loading discriminator connected to said input line and providing an output signal proportional to the relationship of actual loading impedance to a predetermined desired loading impedance; and control means including multi-position switching means in the first position of which said reactance means are caused to be driven to a predetermined homing position, in a second position of which the output line is caused to be disconnected from the input line and from said coupling means, in a third position of which said inductive element of said shunt connected reactance means is connected with said phasing discriminator to receive the output therefrom whereby said inductive element is caused to be driven to parallel resonate stray capacitance of the input line, in a fourth position of which the output line is reconnected to said input line and said coupling means and said series connected reactance means are caused to be adjusted toward parallel resonating said output line, in a fifth position of which said output line is caused to be resonated with said input line by the output from said phasing discriminator at a value no greater than a predetermined desired loading impedance as determined by the output from said loading discriminator, and in a sixth position of which the inductive elements of said reactance means are caused to be positioned in response to output signals from said discriminators until said output signals are eliminated.

2. The network of claim 1 wherein said output line includes an antenna the impedance of which is to be matched to said input line.

3. The network of claim 1 wherein said multiposition switching means causes said phasing discriminator to be connected to drive said shunt connected inductive element when in said third and sixth positions and to drive said series connected inductive element when in said fourth and fifth positions, and wherein said multiposition switching means causes said loading discriminator to be connected to drive said series inductive element in said sixth position.

4. The network of claim 1 wherein said control unit includes means for causing said multiposition switches to automatically advance from one position to the next until impedance matching is completed.

5. The network of claim 1 wherein said control circuit includes means for causing said multiposition switches to assume a fault position if impedance matching is not completed within a predetermined short period of time.

6. The network of claim 5 wherein said short period of time is one minute.

7. A network for matching the electrical impedance of an antenna to an input line, said system comprising: an input line adapted to receive signals over a predetermined range of frequencies; an antenna that is to be matched to said input line at a particular frequency within said predetermined range of frequencies; a variable coupling circuit for coupling said input line to said antenna and varying the impedance of the latter, said coupling circuit including series connected reactance means and shunt connected reactance means, said reactance means including both capacitive and inductive elements; a phasing discriminator connected to said input line and producing an output signal proportional to deviation in phase of voltage and current; a loading discriminator connected to said input line and producing an output signal proportional to the relationship of actual loading impedance to a predetermined desired loading impedance; and control means including at least an eight position switching means in the first position of which said reactance means are caused to assume a predetermined homing position dependent upon said particular frequency selected, in the second position of which said antenna is disconnected from said input line, in a third position of which said inductive element of said shunt connected reactance means is caused to assume a position in response to an output signal from said phasing discriminator to parallel resonate stray capacitance of said input line, in a fourth position of which said antenna is reconnected to said input line and responsive to an output signal from said phasing discriminator said series connected reactance means are caused to assume positions directed toward series resonating said antenna, in a fifth position of which and responsive to an output signal from said phasing discriminator and a reference output signal from said loading discriminator said series connected conductive element and said shunt connected capacitive element are caused to assume positions to series resonate said antenna at an impedance no greater than a predetermined desired value, in a sixth position of which said inductive elements of said reactance means are caused to assume positions in response to said loading discriminator and said phasing discriminator, respectively, to eliminate output signals from said discriminator, in a seventh position of which said elements are maintained in position, and in an eighth position of which said impedance matching is discontinued to indicate equipment fault.

References Cited in the file of this patent

UNITED STATES PATENTS

| | | |
|---|---|---|
| 2,745,067 | True et al. | May 8, 1956 |
| 2,886,752 | De Long | May 12, 1959 |
| 2,910,655 | Ludvigson | Oct. 27, 1959 |
| 2,981,902 | Familier | Apr. 25, 1961 |